US011977721B1

(12) United States Patent
Peterson et al.

(10) Patent No.: US 11,977,721 B1
(45) Date of Patent: May 7, 2024

(54) EVENT SCHEDULING SYSTEM AND METHOD

(71) Applicant: LENOVO (SINGAPORE) PTE. LTD., Singapore (SG)

(72) Inventors: Nathan Peterson, Oxford, NC (US); Russell S. VanBlon, Raleigh, NC (US); Arnold Weksler, Raleigh, NC (US); Mark Delaney, Raleigh, NC (US); John C. Mese, Cary, NC (US)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 0 days.

(21) Appl. No.: 18/191,969

(22) Filed: Mar. 29, 2023

(51) Int. Cl.
*G06Q 10/1093* (2023.01)
*G06F 3/0482* (2013.01)
*G06F 3/0484* (2022.01)

(52) U.S. Cl.
CPC .......... *G06F 3/0484* (2013.01); *G06F 3/0482* (2013.01); *G06Q 10/1095* (2013.01)

(58) Field of Classification Search
CPC ...................... G06F 3/048–05; G06Q 10/1095
See application file for complete search history.

(56) References Cited

U.S. PATENT DOCUMENTS

| 9,235,862 | B1* | 1/2016 | Radner | G06Q 50/01 |
| 11,263,595 | B2* | 3/2022 | Tibrewala | G06Q 10/06 |
| 11,328,368 | B1* | 5/2022 | Labrie | G06N 20/00 |
| 2002/0035493 | A1* | 3/2002 | Mozayeny | G06Q 10/02 |
| | | | | 705/5 |
| 2004/0078256 | A1* | 4/2004 | Glitho | G06Q 10/109 |
| | | | | 709/207 |
| 2006/0045029 | A1* | 3/2006 | Ethier | H04L 12/1818 |
| | | | | 370/260 |
| 2015/0212684 | A1* | 7/2015 | Sabia | G06F 3/0488 |
| | | | | 715/739 |
| 2016/0267404 | A1* | 9/2016 | Shicoff | G06Q 50/01 |
| 2023/0046890 | A1* | 2/2023 | Ost | G06Q 10/1095 |
| 2023/0281568 | A1* | 9/2023 | Logan | G06Q 10/109 |
| | | | | 705/7.19 |

* cited by examiner

*Primary Examiner* — Daniel Rodriguez
(74) *Attorney, Agent, or Firm* — Dean D. Small; The Small Patent Law Group, LLC

(57) ABSTRACT

An event scheduling system and method include receiving a message that includes an availability list of a first participant group of one or more members of a first party for an event to be scheduled. The availability list includes time slots that the first participant group is available for the event. A participant text window is presented on a display device that prompts a user associated with a second party to select members of the second party to form a second participant group. Responsive to receiving a user selection that identifies the members to form the second participant group, calendar data of the second participant group is accessed and cross-referenced with the time slots in the availability list. One or more confirmed time slots are determined in which both the first participant group and the second participant group are available for the event.

20 Claims, 6 Drawing Sheets

428 — Below are times the team is available to meet:

440 — Monday July 11th between 2pm & 4pm ET
440 — Tuesday July 12th between 8am & 9:30am ET
440 — Wednesday July 13th between 3pm & 5pm ET
} 438

430 —
432 — Whose availability do you wish to schedule with? Check all that apply:
☑ Tom B.
☐ Mary T.
☑ Linda W.
☐
436

Submit — 434

FIG. 7

450 —
Based on your selection, please select a time to send calendar invite
452 — ☐ Monday July 11 3:00 pm-3:30 pm ET
452 — ☐ Monday July 11 3:30 pm-4:00 pm ET
452 — ☐ Tuesday July 12 9:00 pm-9:30 am ET Submit — 454
Send Reply message — 456

FIG. 8

EVENT SCHEDULING SYSTEM AND METHOD

FIELD

The present disclosure generally relates to scheduling events that include participants associated with different parties.

BACKGROUND OF THE INVENTION

Scheduling group events with participants from different parties can be difficult. An example is scheduling a teleconference for participants from different organizations. A person from a first organization typically does not have access to the calendar of any people from a second organization, so that person is not able to determine the availability of the people from the second organization without back-and-forth messages communicated between the people of the different organizations. For example, the first person from the first organization may suggest a first set of one or more times based on the availability of the first person and possibly other colleagues at the first organization that would like to participate in the teleconference. A second person at the second organization may receive the first set of one or more times via email, text, a call, or the like. The second person may then have to determine the availability of colleagues at the second organization and then cross-reference the first set of time(s) with the calendars of the second person and the colleagues to determine whether any of the time(s) in the first set are available for the desired participants at the second organization. In some systems, the second person may have to schedule a fake meeting with the colleagues at the second organization just to access their calendars. Alternatively, the second person may have to communicate multiple back-and-forth messages with the colleagues to determine, by process of elimination, whether any of the time(s) in the first set would enable all of the colleagues to attend. This process of sending a multitude of back-and-forth communications, and potentially setting up a fake meeting, just to establish an available date and time for an event is inefficient, time-consuming, and complicated.

To reduce the number of back-and-forth communications, third party services have been established that allow users to upload or link their specific calendar data with a remote server via a network (e.g., the Internet). The third party services may compare the calendar data from multiple different desired participants to determine days and times that are available to all of the participants. However, these services require users to share their calendar data, which could present privacy risks. These services also may require all desired participants to opt-in by signing up for the service, constructively grouping all of the participants into a common party regardless of the participants' associations. Furthermore, these services may charge a fee, such as a recurring periodic fee. Finally, these third party services may require the organizer of an event to navigate to a specific application or website of the third party service in order to schedule the event, forcing the organizer to exit a messaging (e.g., email) application.

A need remains for increasing the efficiency and reducing the time and complexity of scheduling events that involve participants from multiple parties. For example, a need remains for allowing an organizer associated with a first party to schedule an event at a time that is available for multiple participants from the first party and multiple participants from a second party with only a limited number of messages, and without exporting calendar data to a third party service.

SUMMARY

In accordance with an embodiment, a method for scheduling an event is provided. The method includes receiving, via one or more processors, a message including an availability list of a first participant group of one or more members of a first party for an event to be scheduled. The availability list includes time slots that the first participant group is available for the event within a designated time window. The method includes displaying a participant text window on a display device that prompts a user associated with a second party to select one or more members of the second party to form a second participant group for the event. In response to receiving, via an input device, a user selection that identifies the one or more members to form the second participant group, the method includes accessing, via the one or more processors, calendar data of the second participant group. The method includes cross-referencing the calendar data of the second participant group with the time slots in the availability list of the first participant group, and determining one or more confirmed time slots in which both the first participant group and the second participant group are available for the event within the designated time window.

Optionally, the method includes generating a reply message, via the one or more processors, for communication to the first party. The reply message may be generated to include at least one of the one or more confirmed time slots. Optionally, the method includes displaying, via the display device, the one or more confirmed time slots. The one or more confirmed time slots may be displayed in a time selection text window that prompts the user to select an event time from the one or more confirmed time slots. The method may include scheduling the event to occur at the event time that is selected. Optionally, the method may include updating the calendar data of the second participant group to at least temporarily reserve the one or more confirmed time slots that are determined. Optionally, receiving the message may include receiving the availability list as one of (i) text within a body of the message or (ii) an object file attached to the message.

Optionally, the method may include displaying, via the display device, a virtual button on a graphical user interface. The displaying of the participant text window may occur responsive to receiving a user selection of the virtual button via the input device. Displaying the participant text window may include presenting an input bar that enables the user to input identification information of desired members of the second party to form the second participant group. Optionally, the message is an email message, and the method includes analyzing multiple parts of the email message to identify one or more candidate members for the second participant group. The participant text window may present names of the one or more candidate members.

In accordance with an embodiment, an event scheduling system is provided that includes a memory configured to store program instructions, a display device, an input device, and one or more processors communicatively connected to the memory, the display device, and the input device. The program instructions are executable by the one or more processors to receive a message including an availability list of a first participant group of one or more members of a first party for an event to be scheduled. The availability list includes time slots that the first participant group is available for the event within a designated time window. The program instructions are executable by the one or more processors to display a participant text window on the display device, where the participant text window is displayed to prompt a user associated with a second party to select one or more members of the second party to form a second participant group for the event. The program instructions are executable by the one or more processors to access calendar data of the second participant group responsive to receiving, via the input device, a user selection that identifies the one or more members to form the second participant group. The program instructions are executable by the one or more processors to cross-reference the calendar data of the second participant group with the time slots in the availability list of the first participant group, and determine one or more confirmed time slots in which both the first participant group and the second participant group are available for the event within the designated time window.

Optionally, the one or more processors and the memory are integrated within an email platform that operates on a computer device, and the computer device includes the display device and the input device. Optionally, the program instructions are executable by the one or more processors to generate a reply message for communication to the first party, and the reply message is generated to include at least one of the one or more confirmed time slots. Optionally, the program instructions are executable by the one or more processors to display the one or more confirmed time slots in a time selection text window that prompts the user to select an event time from the one or more confirmed time slots. The program instructions are executable by the one or more processors to schedule the event to occur at the event time that is selected.

Optionally, the program instructions are executable by the one or more processors to display, via the display device, a virtual button on a graphical user interface, and the one or more processors display the participant text window responsive to receiving a user selection of the virtual button via the input device. Optionally, the message is an email message, and the program instructions are executable by the one or more processors to analyze multiple parts of the email message to identify one or more candidate members for the second participant group. The participant text window may provide names of the one or more candidate members.

In accordance with an embodiment, a method is provided for scheduling an event. The method includes displaying on a display device a participant text window that prompts a user associated with a first party to select one or more members of the first party to form a first participant group for an event to be scheduled. Responsive to receiving, via an input device, a user selection that identifies the one or more members to form the first participant group, the method includes accessing, via one or more processors, calendar data of the first participant group and determining, based on the calendar data, one or more time slots in which the first participant group is available for the event within a designated time window. The method includes communicating a message, via a communication device, to a second party. The message includes an availability list that provides the one or more time slots.

Optionally, the method includes updating the calendar data of the first participant group to at least temporarily reserve the one or more time slots. Optionally, the method includes displaying on the display device a virtual button on a graphical user interface. The displaying of the participant text window may occur responsive to receiving a user selection of the virtual button via the input device. Optionally, prior to displaying the participant text window, the method includes receiving an event request message requesting that the event be scheduled, and analyzing multiple parts of the event request message to identify one or more candidate members for the first participant group. Displaying the participant text window may include listing names of the one or more candidate members in the participant text window. Optionally, displaying the participant text window may include presenting an input bar that enables the user to input identification information of desired members of the first party to form the first participant group.

BRIEF DESCRIPTION OF THE DRAWINGS

FIG. 7 illustrates content of an availability message and a participant text window according to an embodiment.

FIG. 8 illustrates a time selection window that includes a list of confirmed time slots according to an embodiment.

DETAILED DESCRIPTION

Figure 1:
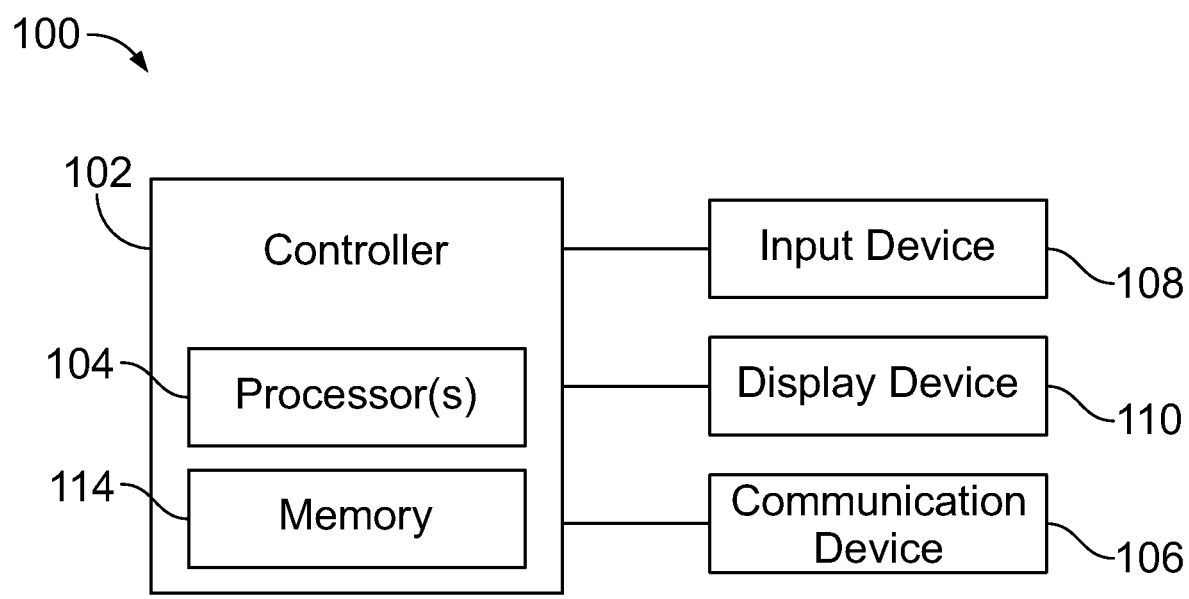
FIG. 1 is a block diagram of an event scheduling system according to an example of the present disclosure.

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

Examples of the present disclosure provide an event scheduling system and method that can efficiently determine one or more time slots available to all desired participants of an event, and schedule the event for one of the time slots. The event may include multiple participants associated with different parties. The event scheduling system and method desirably operates without exporting calendar data outside of party boundaries. For example, the calendar of a first user at a first party is not transmitted outside to any recipient outside of the first party, such as a user of a second party or a third party scheduling service. The event scheduling system and method may desirably avoid numerous back-and-forth communications between participants to resolve the inherent uncertainty of selecting a time slot amount multiple unknown calendars.

The event scheduling system and method presented herein may cross-reference the calendars of a first participant group associated with a first party to generate an availability list. The availability list includes time slots that the first participant group is available for the event within a designated time window. The system and method may send the availability list to a user computer device and/or email account associated with a different (e.g., second) party. The system and method prompts a user that controls the computer device and/or email account to select one or more members associated with the second part to form a second participant group for the event. Upon receiving the user's selection identifying the second participant group, the system and method access calendar data of the second participant group and cross-reference the calendar data with the time slots in the availability list corresponding to the first participant group. The system and method determine one or more confirmed time slots in which all members of both the first and second participant groups would be available for the event within the designated time window. The system and method may then schedule the event to occur at one of the confirmed time slots or communicate the one or more confirmed time slots to another user computer device and/or email account for another user to schedule the event time.

As such, the first computer device or user email address associated with the first party operates as an organizer or point of contact for the event participants from the first party. Likewise, the second computer device or user email address associated with the second party operations as the organizer or point of contact for the event participants of the second party. The system and method are able to determine whether any time slots would be available to all desired participants without multiple rounds of back-and-forth messages or requiring desired participants to export sensitive calendar details outside of the party.

In various examples, the event that is scheduled may be any of various different types of scheduled experiences that involve multiple different people. The event may be a meeting, a family meeting, an appointment, a conference, or the like. The event may be held in-person between the different participants or remotely via network-connected computer devices. In an example, the event may be a teleconference. The system and method described herein may be used in business to set up teleconferences between employees of different organizations. The employees would represent the participants in the teleconference, and the organizations would represent the parties. The teleconferences may include audio-only conference calls, video calls, and/or the like.

The parties described herein refer to groups of people. Example groups that could represent a party include an organization, a business, a school (e.g., university, high school, grade school, trade school, etc.), a family, a team, a club, and/or the like. The people in each party may have shared calendar information, even if the people are not allowed to view the shared calendar information. In an example, the computer devices of a business organization may be communicatively linked (e.g., directly or indirectly via one or more servers) to share calendar information of employees of the business organization. If a particular party has ten members, the calendars of the ten members may be accessible to a user computing device of one of the members (e.g., even if the user computing device does not display or otherwise present the calendars of all ten members to the user for observation). The system and method may utilize the shared calendar information to determine time slots that are available for all desired event participants from the same party, and to cross-reference received available time slots for a first party with availability of desired event participants from second party.

In an embodiment, the event scheduling system may be integrated onto one or more user computer devices. The one or more user computer devices may perform the operations of the event scheduling method described herein. The terms "user computer device" and "computer device", unless specified, shall mean any of various types of hardware devices that perform processing operations. The computer devices may be personal computers, such as laptops, desktops, tablets, smartphones, smart watches or other wearable computer devices, and the like). Optionally, the computer devices may include computer workstations, smart televisions, video conference hub devices or stations, or the like, which have sufficient hardware and circuitry to perform the processing operations of the event scheduling system and method. The event scheduling system optionally may include one or more components besides the user computer device(s). For example, the event scheduling system may include at least one remote server that communicates with the user computer device(s) to perform some of the functions of the event scheduling method.

FIG. 1 is a block diagram of an event scheduling system 100 according to an embodiment. The event scheduling system 100 includes a controller 102 that performs some or all of the operations described herein to determine time slots that are open for all desired participants of an event. The event scheduling system 100 may include an input device 108 and a display device 110 for allowing interaction with one or more users (e.g., people). The event scheduling system 100 may also include a communication device 106 for sending and receiving communications (e.g., messages). The controller 102 is operably connected to the other components of the event scheduling system 100 via wired and/or wireless communication links to permit the transmission of information in the form of signals. For example, the controller 102 may generate control signals that are transmitted to the other components to control operation of the components. The event scheduling system 100 may have additional components that are not shown in FIG. 1. In an alternative embodiment, the event scheduling system 100 may lack one or more of the components shown in FIG. 1.

The controller 102 represents hardware circuitry that includes and/or is connected with one or more processors 104 (e.g., one or more microprocessors, integrated circuits, microcontrollers, field programmable gate arrays, etc.). The controller 102 includes and/or is connected with a tangible and non-transitory computer-readable storage medium (e.g., data storage device), referred to herein as memory 114. The memory 114 may store programmed instructions (e.g., software) that are executed by the one or more processors 104 to perform the event scheduling operations described herein. The programmed instructions may include one or more algorithms utilized by the one or more processors 104. References herein to the controller 102 may refer to the one or more processors 104 thereof.

For example, one or more algorithms stored in the memory 114 may be used by the processor(s) 104 to display a participant text window on a display device that prompts a user to select one or more members of a party to form a participant group for an event to be scheduled. Optionally, the one or more algorithms may also be used by the processor(s) 104 to analyze an email message to determine one or more candidate participants in an event, where the participant text window presents the names of the candidate participant(s). In response to receiving a user selection that identifies members of the party to form the participant group, the processor(s) 104 may access calendar data of the members of the participant group and cross-reference the calendar data to determine time slots in which the participant group is available for the event within a designated time window. The processor(s) 104 may then generate a message including availability list that provides the time slots that are determined, and communicate the message to a user computer device associated with a different, second party. Alternatively, the processor(s) 104 may receive an availability list corresponding to a second participant group of the second party, and cross-reference the time slots in that received availability list with the time slots that are determined to be available for the participants of the first group, yielding confirmed time slots in which both participant groups of the two parties would be available for the event. The processor(s) 104 may then automatically schedule the event to occur at one of the confirmed time slots, display the confirmed time slots on a display device to prompt a user to select which of the confirmed time slots to use for scheduling the event, or communicate the confirmed time slots to a computer device of the other party for a user associated with the second party to schedule the event. Additional aspects of the one or more algorithms for scheduling an event are described herein.

The memory 114 may store one or more databases that contain information utilized by the one or more processors 104. For example, a member database may include identification information for the members of the party. The identification information may include names of the members and contact information, such as email addresses, phone numbers, etc. The identification information optionally may include position information (e.g., job title), status (e.g., employment status), notes (e.g., copy Person B on all emails to Person A), and/or the like. The memory 114 may store graphical user interfaces (GUIs) for presentation on a display device. The memory 114 may store additional applications, such as various application program interfaces (APIs) that link to cloud hosting services, via the communication device 106, for accessing information from remote storage devices, such as servers.

The communication device 106 represents hardware circuitry that can communicate electrical signals via wireless communication pathways and/or wired conductive pathways. The communication device 106 may be used to send and receive messages with remote servers and other user computer devices via a network. In an example, the communication device 106 may include a modem, a router, and/or the like for network communications. The communication device 106 may include transceiving circuitry. Optionally, the transceiving circuitry may include one or more antennas for wireless communication.

The input device 108 is designed to receive user-based inputs from a user that interacts with the input device 108 to generate user selections. The user selections are control signals that are communicated from the input device 108 to the controller 102. The input device 108 may include or represent a touch sensitive screen or touch pad, a mouse, a keyboard, a joystick, a switch, physical buttons, a microphone that receives audio inputs, and/or the like. A user may actuate (e.g., manipulate, provide touch inputs, provide voice inputs, etc.) the input device 108 to generate the user selection. The user selections may be generated in response to text windows displayed on the display device 110 which prompt the user to provide user selections using the input device 108.

The display device 110 includes a display screen that presents graphical indicia, such as images, shapes, text and symbols, for viewing by the user. The display device 110 may display a graphical user interface (GUI). The GUI may include text windows that present information to the user and prompt the user to make user selection. For example, the GUI may include participant text window for selecting one or more members of a party to participate in the event to be scheduled. Optionally, the GUI may be of an application or website, such as a messaging platform. The messaging platform may be an email platform. The display device 110 may be an integral component of a user computer device, such as the display screen of a laptop, tablet, or smartphone. Alternatively, the display device 110 may be a peripheral component that is communicatively connected to a user computer device, such as a monitor that is connected to a laptop computer.

Figure 2:
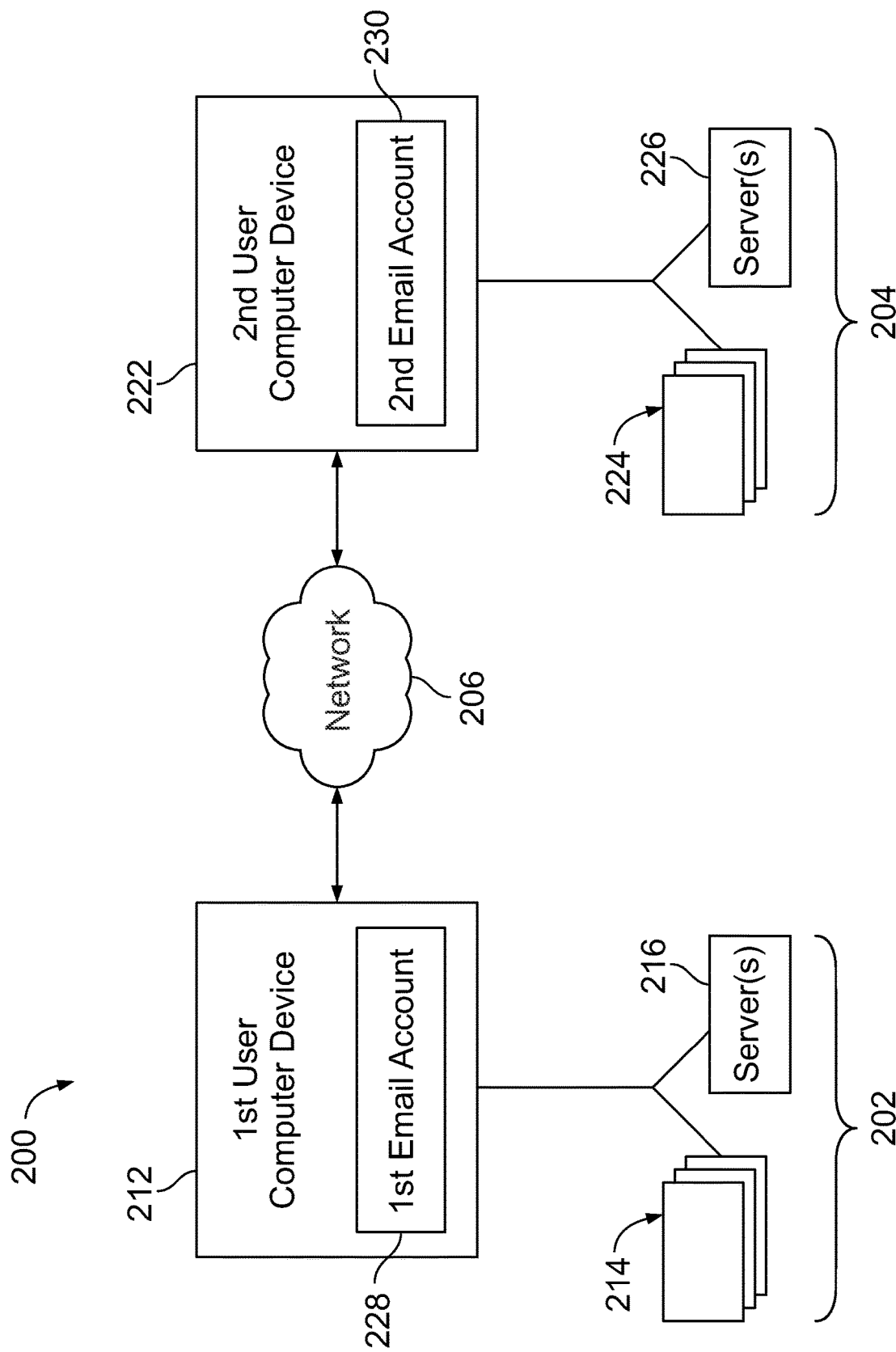
FIG. 2 is a diagram of a communication system according to an embodiment.

FIG. 2 is a diagram of a communication system 200 according to an embodiment. The communication system 200 includes a first party 202, a second party 204, and a network 206 through which the first party 202 and the second party 204 can communicate with each other. The first party 202 may include a first user computer device 212, a set of one or more additional user computer devices 214, and one or more servers 216. The first user computer device 212, additional user computer devices 214, and servers 216 may be communicatively connected to one another via wired and/or wireless communication pathways. For example, the devices of the first party 202 may be connected via a first local network. The first local network may be a local area network (LAN), a local wireless network, Bluetooth connections, and/or the like. The servers 216 are optional and may provide data storage and/or processing services for the first party 202. For example, the servers 216 may store calendar data for all members of the first party 202. The servers 216 optionally may store a member database that includes identifying information and contact information for all members of the first party 202. Optionally, the calendar data for different members of the first party 202 may be stored on the different user computer devices 212, 214 associated with different specific users, and the calendar data may be shared between the computer devices 212, 214.

The second party 204 may have similar components as the first party 202. For example, the second party 204 may include a second user computer device 222, a set of one or more additional user computer devices 224, and one or more servers 226. The second user computer device 222, additional user computer devices 224, and servers 226 may be communicatively connected to one another via wired and/or wireless communication pathways. For example, the devices of the second party 204 may be connected via a second local network. The second local network may be a local area network (LAN), a local wireless network, Bluetooth connections, and/or the like. The servers 226 are optional and may provide data storage and/or processing services for the second party 204. For example, the servers 226 may store calendar data for all members of the second party 204 and/or a member database that includes identifying information and contact information for all members of the second party 204. Optionally, the calendar data for different members of the second party 204 may be stored on the different user computer devices 222, 224 associated with different specific users, and the calendar data may be shared between the computer devices 222, 224.

The first user computer device 212 may represent an organizer, or point-of-contact, for the first party 202 for scheduling the event. The second user computer device 222 may represent the organizer or point-of-contact for the second party 204. The first user computer device 212 may be communicatively connected to the second user computer device 222 via the network 206. The network 206 may be an external network that is not contained within a single party. For example, the network 206 may be the Internet.

In an example application, the event scheduling system 100 (shown in FIG. 1) may be utilized to schedule an event between participants of the first party 202 and participants of the second party 204. The event may be, for example, a teleconference between employees of a first company (e.g., business organization) and employees of a second company. The components of the event scheduling system 100 shown in FIG. 1 may be integrated into the first user computer device 212, the second user computer device 222, or both the first and second user computer devices 212, 222. In an example, the algorithm of the event scheduling system 100 may be built-in to one or both user computer devices 212, 222. For example, the algorithm may be an inherent feature of a messaging and/or calendar program (e.g., application) installed on the respective user computer device 212, 222.

In an embodiment, a first user associated with the first party 202 may operate the first user computer device 212 to communicate email messages with a second user associated with the second party 204 who operates the second user computer device 222. For example, the first user may sign-on to a first email account 228 associated with the first user and the first party. The second user may sign-on to a second email account 230 associated with the second user and the second party. The first and second email accounts 228, 230 may be used to communicate email messages between the two parties 202, 204 for scheduling the event. In an embodiment, the event scheduling system 100 may limit the number of email messages between the email accounts 238, 230 to less than conventional procedures of setting up meetings and other events between different parties.

Figure 3:
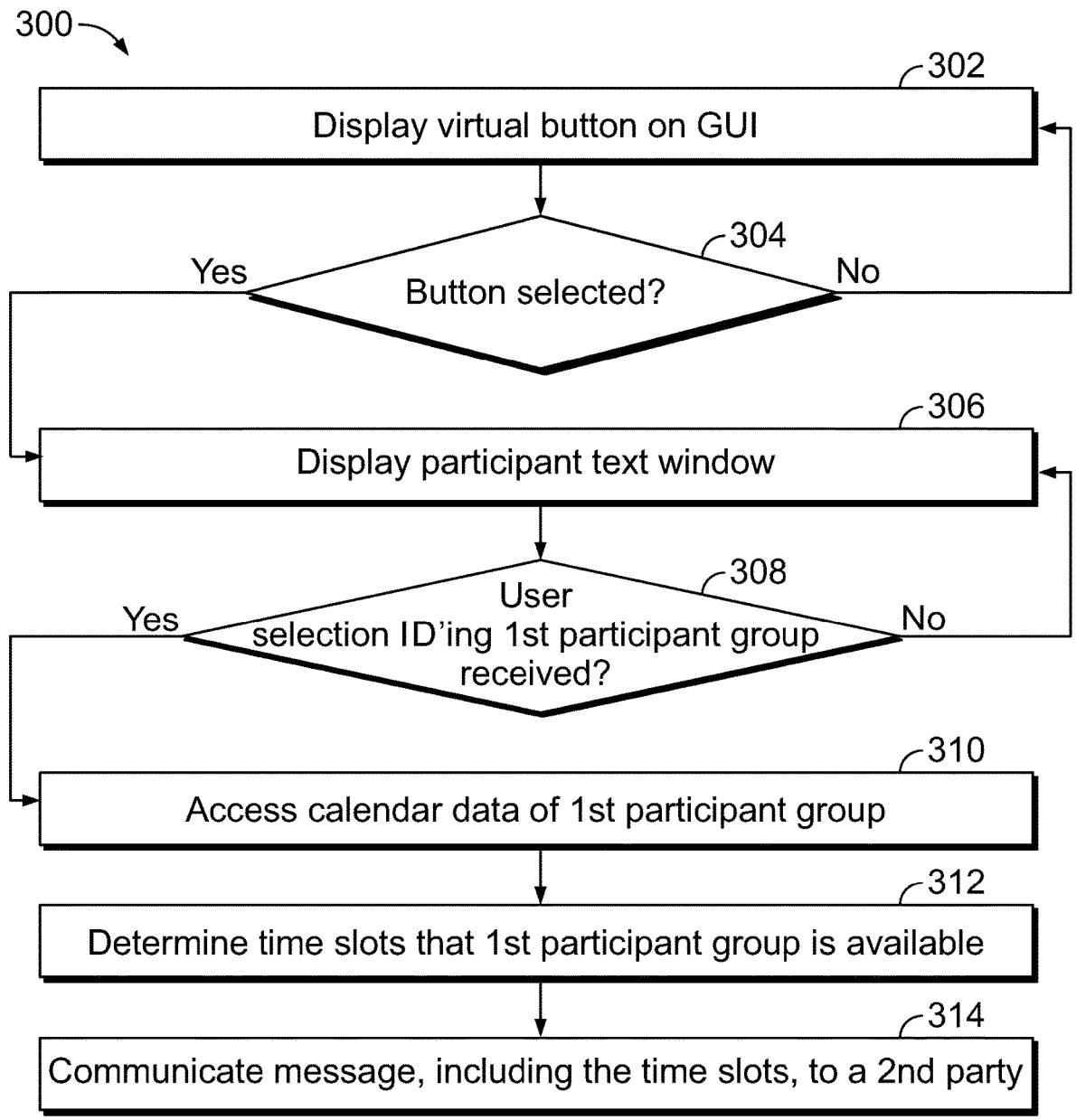
FIG. 3 is a flow chart of a first portion of a method for scheduling an event according to an embodiment.

FIG. 3 is a flow chart 300 of a first portion of a method of scheduling an event according to an embodiment. The method may be performed by the controller 102 of the event scheduling system 100. The method is described with reference to the first and second parties 202, 204 shown in FIG. 2. The method optionally may include at least one additional step than shown, at least one fewer step than shown, and/or at least one different step than shown in FIG. 3. The first portion of the method shown in FIG. 3 may be performed by the controller 102 of the first user computer device 212.

Figures 4, 5:
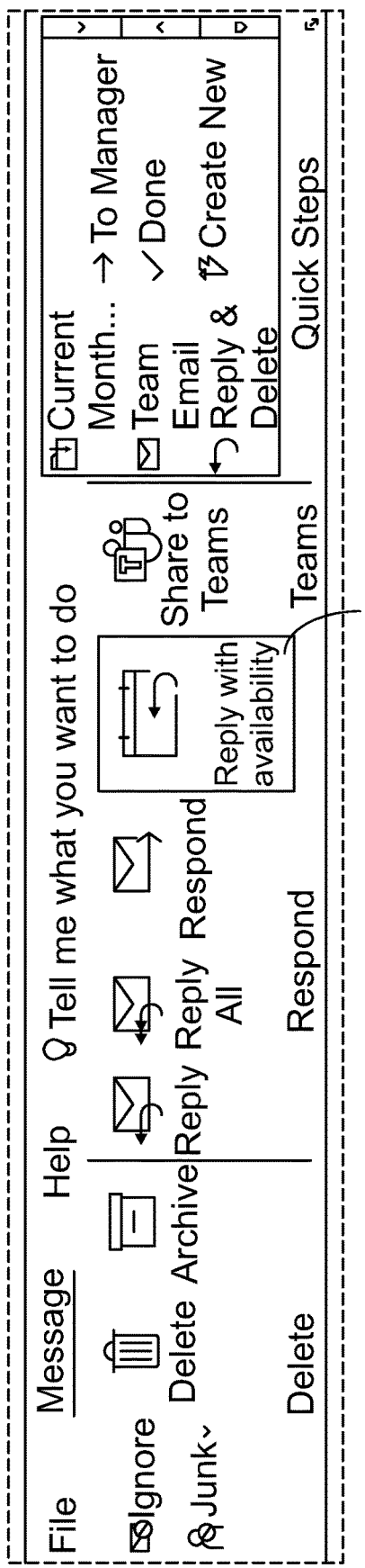
FIG. 4 illustrates a portion of a graphical user interface according to an embodiment.
FIG. 5 illustrates a participant text window according to an embodiment.

At step 302, a virtual button is displayed on a graphical user interface (GUI) presented on the display device 110. FIG. 4 illustrates a portion of a GUI 320. The GUI 320 may be associated with a messaging program (e.g., application). The messaging program may be an email program. The GUI 320 includes various virtual buttons indicated by icons to perform different functions, such as to reply to an email message and delete an email message. The GUI 320 may display a virtual button 322 that is used to initiate the event scheduling method. The button 322 in the illustrated example states, "Reply with availability", although it is recognized that the button 322 may have a different graphic icon and/or different text in other embodiments. The first user may select the button 322 via the input device 108.

In a first example, the first user computer device 212, via the first email account 228, may receive an event request message requesting an event to be scheduled. The event request message optionally may be received from the second email account 230 associated with the second party 204. The first user computer device 212 displays the contents of the event request message on the display device 110. The first user may react to the event request message by selecting the virtual button 322 to initiate the event scheduling method. In a second example, the first user may decide to initiate the event scheduling method without receiving an event request message. For example, the first user may initiate or open the messaging program, and then select the virtual button 322 to begin the scheduling process.

At step 304, it is determined whether the virtual button 322 has been selected. For example, the controller 102 determines whether a control signal has been received from the input device 108 within a current time period indicating selection of the virtual button 322. If so, then the method proceeds to step 306 and a participant text window is displayed by the display device 110. If not, then flow returns to step 302.

The participant text window may be displayed on the GUI 320. For example, the participant text window may be a pop-out window or a window that is superimposed on the GUI 320. The participant text window prompts the first user to select one or more members of the first party 202 to form a first participant group for the event to be scheduled. For example, if the event is a meeting to discuss a work project, the first user may want to invite the members of a team working on the project to participate in the meeting. The members of the team would constitute all or a subset of the first participant group.

FIG. 5 illustrates a participant text window 330 according to an embodiment. In an example, the controller 102 may generate the participant text window 330 to list the names of one or more candidate members 332. The controller 102 may determine the candidate members 332 by analyzing multiple parts of the event request message. For example, the controller 102 may automatically analyze the sender information, the recipient information, the carbon copy information, the body of the message, and optionally the contents of attachments to detect reference to members of the first party 202. In an example, if the event request message is sent to several members of the first party 202, the controller 102 may include the names of those members as candidate members 332 in the participant text window 330. In the illustrated example, the participant text window 330 lists the names of five candidate members 332 of the first party 202 next to check boxes. The candidate members 332 may include the first user whose email account 228 received the event request message.

The participant text window 330 states, "Whose availability do you wish to reply with? Check all that apply:" in order to prompt the first user to provide a user selection. Upon viewing the participant text window 330, the first user can utilize the input device 108 to select one or more of the candidate members 332 to include in the first participant group. The selected candidate members are indicated by check marks in FIG. 5. Optionally, the controller 102 may determine the candidate members 332 that are listed on the text window 330 based on one or more user settings in addition to the parts of the event request message. For example, one user setting may specify to always include "person B" as a candidate member when "person A" receives an event request message.

The participant text window 330 may include a "submit" button 334 that the user can select, via the input device 108, to lock in the selected members of the first participant group and advance the event scheduling process. Optionally, the participant text window 330 may be displayed to present an input bar 336 that enables the first user to input identification information of one or more desired members of the first party 202 that are not listed as a candidate member 332. For example, the input bar 336 may be a search bar that enables the first user to enter a name, ID number, or other identifying characteristic. Upon receiving an entry in the input bar 336, the controller 102 may access a first party 202 database to attempt to match the entry with a specific member in the database. The first user can add more members to the first participant group using the input bar 336. The first user can delete or leave the check boxes of other candidate members 332 unchecked to reduce the size of the first participant group.

At step 308, it is determined whether a user selection identifying the members of the first participant group has been received. For example, the controller 102 determines whether a control signal has been received from the input device 108 within a current time period indicating selection of the submit button 334 confirming the first participant group. If so, then the method proceeds to step 310. If not, then flow returns to step 306.

At step 310, calendar data of the first participant group is accessed. As shown in FIG. 2, the controller 102 of the first user computer device 212 may communicate with the other user computer devices 214 and/or the server(s) 216 to access the calendar data of the individual members that constitute the first participant group. At step 312, time slots are determined in which the first participant group is available for the event. The controller 102 may cross-reference the calendars of the various members of the first participant group to determine time slots in which all of the members are available. The time slots may be designated time periods, such as a half hour, one hour, two hours or the like. The controller 102 may analyze the calendar data within a designated time window in which the event is desired to occur. For example, the designated time window may be within one week, within two weeks, or the like. The duration of the time slots and/or the length of time of the designated time window may be user-modifiable settings. Depending on the type of event, the controller 102 may be constrained by the time of day and/or day of the week. For example, for a business meeting, the controller 102 may only search for open time slots from Monday through Friday during normal business hours. The day of week and time of day constraints may also be user-modifiable settings.

Once the controller 102 determines time slots in which all of the members of the first participant group are available for the event, flow proceeds to step 314. At step 314, a message including the time slots is communicated to the second party 204. For example, the controller 102 may generate an availability message that is communicated from the first user computer device 212 to the second user computer device 222 of the second party 204. In an example, the availability message may be an email message that is sent from the first email account 228 to the second email account 230. Alternatively, the availability message may be text (SMS) message or the like. The availability message is communicated from the first party 202 to the second party 204 via the network 206. The availability message may include an availability list presenting the time slots that the controller 102 determines to be open for all members of the first participant group. The availability list may be presented as text within a body of the message. Alternatively, the availability list may be an object file that is attached to the message.

Although not shown in the flow chart, the method may also include updating the calendar data of the first participant group to temporarily reserve the time slots. Placing a temporary hold on the time slots may reduce the risk of a scheduling conflict arising before the event time is finalized. For example, if a member of the first participant group attempts to schedule another event during one of the time slots that are temporarily reserved, the controller 102 may display a notification message encouraging the member to select a different time or wait to schedule the other event until the first event is finalized.

Figure 6:
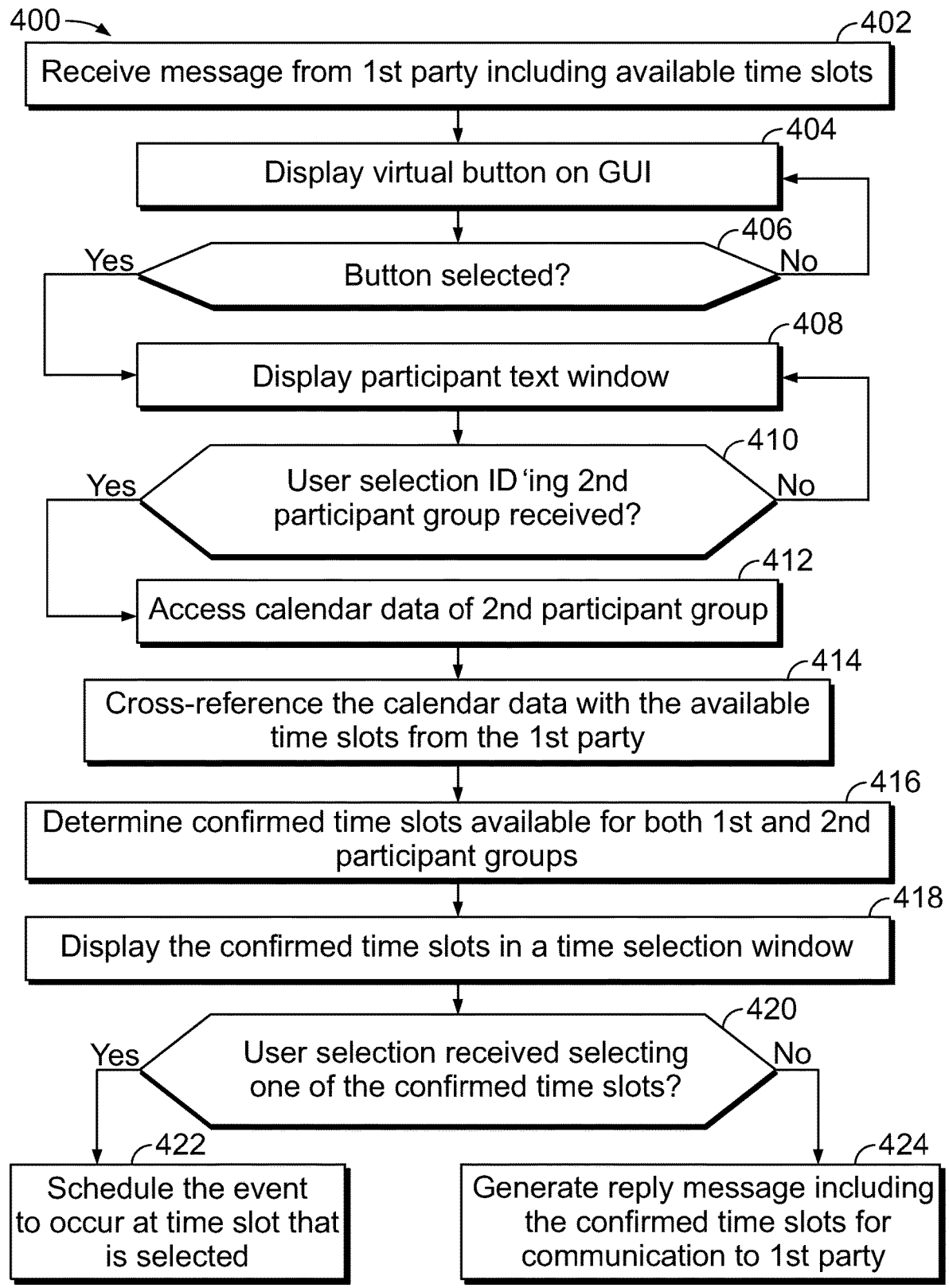
FIG. 6 is a flow chart of a second portion of the method for scheduling an event according to an embodiment.

FIG. 6 is a flow chart 400 of a second portion of the method of scheduling an event according to an embodiment. The second portion of the method shown in FIG. 6 may follow the first portion of the method shown in FIG. 3. The second portion may be performed by the controller 102 of the second user computer device 222.

At step 402, a message is received from a first party. The message includes an availability list of a first participant group for an event to be scheduled. The availability list includes time slots that the first participant group is available for the event within a designated time window. The message may be the availability message that is communicated at step 314 in FIG. 3. The availability message may be received by the second user computer device 222 of the second party 204. Optionally, the availability message may be an email message that is transmitted to the second email account 230 of a second user affiliated with the second party 204. The controller 102 of the second user computer device 222 may display contents of the availability message on the display device 110 of the second user computer device 222 for the second user to view the contents. The availability list may be received as text within the body of the message or as an object file attached to the message.

At step 404, a virtual button is displayed on a GUI of the display device 110 of the second user computer device 222. In an embodiment, the virtual button may be the same button 322 that is shown in FIG. 4. The display device 110 may display the contents of the availability message that is received. The virtual button 322 is used to the initiate the event scheduling system 100 of the second user computer device 222 to perform event scheduling functions. The second user may select the button 322 via the input device 108 of the second user computer device 222. For example, the second user may open the availability message that is received, and then may select the button 322 in order to select a second participant group for the event.

At step 406, it is determined whether the virtual button 322 has been selected. For example, the controller 102 determines whether a control signal has been received from the input device 108 within a current time period indicating selection of the virtual button 322. If so, then the method proceeds to step 408 and a participant text window is displayed by the display device 110. If not, then flow returns to step 404.

The participant text window may be displayed on the GUI. For example, the participant text window may be a pop-out window or a window that is superimposed on the GUI. The participant text window prompts the second user to select one or more members of the second party 204 to form a second participant group for the event to be scheduled. For example, the second user may want to invite the members of a team working on a project to participate in the meeting, where the members of the team would constitute all or a subset of the second participant group.

FIG. 7 illustrates content 428 of an availability message and a participant text window 430 according to an embodiment. In an example, the controller 102 may generate the participant text window 430 to list the names of one or more candidate members 432 of the second party 204. The controller 102 may determine the candidate members 432 by analyzing multiple parts of the availability message. For example, the controller 102 may automatically analyze the sender information, the recipient information, the carbon copy information, the body of the message, and optionally the contents of attachments to detect references to members of the second party 204. In an example, if the availability message refers to several members of the second party 204, the controller 102 may include the names of those members as candidate members 432 in the participant text window 430. In the illustrated example, the participant text window 430 lists the names of three candidate members 432 of the second party 204 next to check boxes. The candidate members 432 may include the second user whose email account 230 received the availability message.

The participant text window 430 states, "Whose availability do you wish to schedule with? Check all that apply:" in order to prompt the second user to provide a user selection. Upon viewing the participant text window 430, the second user can utilize the input device 108 to select one or more of the candidate members 432 to include in the second participant group. The selected candidate members are indicated by check marks in FIG. 7. Optionally, the controller 102 may determine the candidate members 332 that are listed on the text window 430 based on one or more user settings in addition to the parts of the event request message. For example, one user setting may specify to always include "person B" as a candidate member when "person A" receives an availability message.

The participant text window 430 may include a "submit" button 434 that the user can select, via the input device 108, to lock in the selected members of the second participant group and advance the event scheduling process. Optionally, the participant text window 430 may be displayed to present an input bar 436 that enables the second user to input identification information of one or more desired members of the second party 204 that are not listed as a candidate member 432. For example, the input bar 436 may be a search bar that enables the second user to enter a name, ID number, or other identifying characteristic. Upon receiving an entry in the input bar 436, the controller 102 may access a second party database to attempt to match the entry with a specific member in the database. The second user can add more members to the second participant group using the input bar 436. The second user can delete or leave the check boxes of other candidate members 432 unchecked to reduce the size of the second participant group.

The participant text window 430 may be displayed next to the content 428 of the availability message. The content 428 may include the availability list 438 that provides the multiple different time slots 440 that are open for the first participant group of the first party 202 within the designated time window. In the illustrated example, the availability list 438 is presented as text within the body of the availability message. The second user is able to concurrently observe both the available time slots 440 and the participant text window 430.

At step 410, it is determined whether a user selection identifying the members of the second participant group has been received. For example, the controller 102 determines whether a control signal has been received from the input device 108 of the second user computer device 222 within a current time period indicating selection of the submit button 434 confirming the second participant group. If so, then the method proceeds to step 412. If not, then flow returns to step 408.

At step 412, calendar data of the second participant group is accessed. As shown in FIG. 2, the controller 102 of the second user computer device 222 may communicate with the other user computer devices 224 and/or the server(s) 226 to access the calendar data of the individual members that constitute the second participant group. At step 414, the calendar data of the second participant group is cross-referenced with the time slots from the first party 202. This step may optionally include two parts. In a first part, the controller 102 may compare and cross-reference the calendars of the members of the second participant group to determine time slots within the designated time window in which all members of the second participant group are available for the event. In a second part, the available time slots of the second participant group are compared to and cross-referenced with the available time slots 440 of the first participant group as contained in the availability list 438. The time slots of the second participant group may be subject to the same constraints as the time slots of the first participant group described above with reference to FIG. 3.

At step 416, one or more confirmed time slots are determined. The confirmed time slots are time slots that are available for both the first participant group and the second participant group to attend the event. At step 418, the confirmed time slots are displayed in a time selection window. The controller 102 of the second user computer device 222 may display the confirmed time slots on the display device 110 for viewing by the second user.

FIG. 8 illustrates a time selection window 450 that includes a list of confirmed time slots 452 according to an embodiment. The controller 102 may generate and present the time selection window 450 on the display device 110 upon determining the confirmed time slots 452 based on cross-referencing the calendar data of the second participant group with the availability list of the first participant group. In the illustrated example, the time selection window 450 lists three confirmed time slots 452. The three confirmed time slots 452 may represent the total number of time slots, within the designated time window, time of day, and day of week constraints, that are open for all participants of the two groups. As such, the time selection window 450 may include more or less than three confirmed time slots 452 in other situations. The illustrated time selection window 450 includes text that states, "Based on your selection, please select a time to send calendar invite". This text prompts the second user to provide a user selection. Upon viewing the time selection window 450, the second user can utilize the input device 108 to select one of the confirmed time slots 452 to use for scheduling the event. The time selection window 450 may include a "submit" button 454 that the user can select, via the input device 108, to advance the event scheduling process.

Optionally, the controller 102 of the second user computer device 222 may update the calendar data of the second participant group to at least temporarily reserve the one or more confirmed time slots 452 that are determined. For example, if a member of the second participant group attempts to schedule another event during one of the confirmed time slots that are temporarily reserved, the controller 102 may display a notification message encouraging the member to select a different time or wait to schedule the other event until the first event is finalized.

At step 420, it is determined whether a user selection has been received that selects one of the confirmed time slots. If so, then the method may advance to step 422. At step 422, the event is scheduled to occur at the confirmed time slot that is selected by the second user. For example, referring to FIG. 8, if the second user selects the Tuesday, July 12 confirmed time slot 452 and then selects the Submit button 454, the controller 102 may schedule the event to occur on Tuesday, July 12 from 9:00-9:30 AM ET. The controller 102 may schedule the event by generating an event invitation message that is communicated to the user computer devices (e.g., email accounts) of the members in both the first and second participant groups. The event invitation message may include event details, such as a link for accessing a video teleconference. The event details may include the date and time of the event, which can be imported into the calendars of the participants.

Optionally, if no user selection is received at step 420, then flow may proceed to step 424. At step 424, a reply message may be generated that is communicated back to the first party. The reply message may include the confirmed time slots 452. The reply message may be generated and communicated back to the first user computer device 212 to enable the first user to select the time for the event and/or send out the event invitation message. Optionally, the time selection window 450 that is presented on the display device 110 of the second user computer device 222 may include a "Send Reply Message" button 456. Upon receipt of a user selection of that button 456, the controller 102 may generate the reply message including the confirmed time slots 452 for communication to the first user computer device 212. The reply message may also include name and contact information for the members of the second participant group. The first user computer device 212 can send the event invitation message to the second participant group using the contact information contained in the reply message.

As described herein, the event can be scheduled for a time that is available for all desired participants with as few as one message communicated between two different parties, and does not export sensitive calendar data outside of the party. The only calendar data that is leaves the party is time slots that are determined to be available for all members of a participant group within a designated time window. The event scheduling system and method described herein may enable efficient scheduling of events, such as teleconferences. Although the example described herein involves two parties 202, 204, the event scheduling system and method can be used to schedule events between three or more parties. For example, the confirmed time slots that are available to both the first and second participant groups may be sent in an availability list to a third user computer device of a third party, for that controller to then determine a third participant group and cross-reference the calendar data of the third participant group with the confirmed time slots in the availability list.

Closing Statements

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

Aspects are described herein with reference to the Figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified. The program instructions may also be loaded onto a device to cause a series of operational steps to be performed on the device to produce a device implemented process such that the instructions which execute on the device provide processes for implementing the functions/acts specified.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally, or alternatively, the units/modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Further, in the following claims, the phrases "at least A or B", "A and/or B", and "one or more of A and B" (where "A" and "B" represent claim elements), are used to encompass i) A, ii) B or iii) both A and B.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A method for scheduling an event, the method comprising:
   receiving, via one or more processors, a message including an availability list of a first participant group of one or more members of a first party for an event to be scheduled, the availability list including time slots that the first participant group is available for the event within a designated time window;
   displaying a participant text window on a display device that prompts a user associated with a second party to select one or more members of the second party to form a second participant group for the event;
   responsive to receiving, via an input device, a user selection that identifies the one or more members to form the second participant group, accessing, via the one or more processors, calendar data of the second participant group;
   cross-referencing the calendar data of the second participant group with the time slots in the availability list of the first participant group; and
   determining one or more confirmed time slots in which both the first participant group and the second participant group are available for the event within the designated time window.

2. The method of claim 1, further comprising generating a reply message, via the one or more processors, for communication to the first party, the reply message generated to include at least one of the one or more confirmed time slots.

3. The method of claim 1, further comprising, displaying, via the display device, the one or more confirmed time slots.

4. The method of claim 3, wherein the one or more confirmed time slots are displayed in a time selection text window that prompts the user to select an event time from the one or more confirmed time slots, and the method comprises scheduling the event to occur at the event time that is selected.

5. The method of claim 1, further comprising updating the calendar data of the second participant group to at least temporarily reserve the one or more confirmed time slots that are determined.

6. The method of claim 1, wherein receiving the message comprises receiving the availability list as one of (i) text within a body of the message or (ii) an object file attached to the message.

7. The method of claim 1, further comprising displaying, via the display device, a virtual button on a graphical user interface, and wherein the displaying of the participant text window occurs responsive to receiving a user selection of the virtual button via the input device.

8. The method of claim 1, wherein displaying the participant text window includes presenting an input bar that enables the user to input identification information of desired members of the second party to form the second participant group.

9. The method of claim 1, wherein the message is an email message and the method further comprises analyzing multiple parts of the email message to identify one or more candidate members for the second participant group, wherein the participant text window presents names of the one or more candidate members.

10. An event scheduling system comprising:
    a memory configured to store program instructions;
    a display device;

an input device; and
one or more processors communicatively connected to the memory, the display device, and the input device, wherein the program instructions are executable by the one or more processors to:
  receive a message including an availability list of a first participant group of one or more members of a first party for an event to be scheduled, the availability list including time slots that the first participant group is available for the event within a designated time window;
  display a participant text window on the display device, the participant text window displayed to prompt a user associated with a second party to select one or more members of the second party to form a second participant group for the event;
  access calendar data of the second participant group responsive to receiving, via the input device, a user selection that identifies the one or more members to form the second participant group;
  cross-reference the calendar data of the second participant group with the time slots in the availability list of the first participant group; and
  determine one or more confirmed time slots in which both the first participant group and the second participant group are available for the event within the designated time window.

11. The event scheduling system of claim 10, wherein the one or more processors and the memory are integrated within an email platform that operates on a computer device, the computer device including the display device and the input device.

12. The event scheduling system of claim 10, wherein the program instructions are executable by the one or more processors to generate a reply message for communication to the first party, the reply message generated to include at least one of the one or more confirmed time slots.

13. The event scheduling system of claim 10, wherein the program instructions are executable by the one or more processors to:
  display the one or more confirmed time slots in a time selection text window that prompts the user to select an event time from the one or more confirmed time slots; and
  schedule the event to occur at the event time that is selected.

14. The event scheduling system of claim 10, wherein the program instructions are executable by the one or more processors to display, via the display device, a virtual button on a graphical user interface, and the one or more processors display the participant text window responsive to receiving a user selection of the virtual button via the input device.

15. The event scheduling system of claim 10, wherein the message is an email message, and the program instructions are executable by the one or more processors to analyze multiple parts of the email message to identify one or more candidate members for the second participant group, wherein the participant text window provides names of the one or more candidate members.

16. A method for scheduling an event, the method comprising:
  displaying on a display device a participant text window that prompts a user associated with a first party to select one or more members of the first party to form a first participant group for an event to be scheduled;
  responsive to receiving, via an input device, a user selection that identifies the one or more members to form the first participant group, accessing, via one or more processors, calendar data of the first participant group;
  determining, based on the calendar data, one or more time slots in which the first participant group is available for the event within a designated time window;
  communicating a message, via a communication device, to a second party, the message including an availability list that provides the one or more time slots.

17. The method of claim 16, further comprising updating the calendar data of the first participant group to at least temporarily reserve the one or more time slots.

18. The method of claim 16, further comprising displaying on the display device a virtual button on a graphical user interface, and wherein the displaying of the participant text window occurs responsive to receiving a user selection of the virtual button via the input device.

19. The method of claim 16, further comprising:
  prior to displaying the participant text window, receiving an event request message requesting that the event be scheduled; and
  analyzing multiple parts of the event request message to identify one or more candidate members for the first participant group, wherein displaying the participant text window comprises listing names of the one or more candidate members in the participant text window.

20. The method of claim 16, wherein displaying the participant text window includes presenting an input bar that enables the user to input identification information of desired members of the first party to form the first participant group.

* * * * *